United States Patent [19]

Stremeckus

[11] Patent Number: 4,717,161

[45] Date of Patent: Jan. 5, 1988

[54] MULTIPLE-LIP SEAL FOR CYLINDER ROD AND THE LIKE

[75] Inventor: Mark W. Stremeckus, Maynard, Mass.

[73] Assignee: A. W. Chesterton Company, Stoneham, Mass.

[21] Appl. No.: 43,156

[22] Filed: Apr. 27, 1987

[51] Int. Cl.⁴ .............................................. F16J 15/32
[52] U.S. Cl. .................................. 277/105; 277/152; 277/205
[58] Field of Search ............... 277/134, 152, 153, 105, 277/106, 205

[56] References Cited

U.S. PATENT DOCUMENTS

| | | | |
|---|---|---|---|
| 4,239,245 | 12/1980 | Giglio et al. | 277/203 |
| 4,336,946 | 6/1982 | Wheeler | 277/152 X |
| 4,369,977 | 1/1983 | Bishop et al. | 277/152 X |
| 4,425,838 | 1/1984 | Pippert | 277/152 X |

FOREIGN PATENT DOCUMENTS 1038663  8/1966  United Kingdom ............... 277/152

OTHER PUBLICATIONS

*Chesterton Sealing Devices*, published by A. W. Chesterton Company, 1982, pp. 61 and 65.

Primary Examiner—Robert S. Ward

[57] ABSTRACT

An integral sealing system for a cylinder or piston rod and the like, for bearing, sealing and wiping a piston rod during reciprocating motion, is a molded polymeric unit. The integral system includes a body terminating at one end in a divergent pair of generally axially-extending annular tapered lips, the outer surfaces of the pair of lips defining sealing surfaces. The body of the integral system terminates at the other end in an inwardly tapering surface and protruding lip for wiping of the rod surface to exclude contaminants.

3 Claims, 3 Drawing Figures

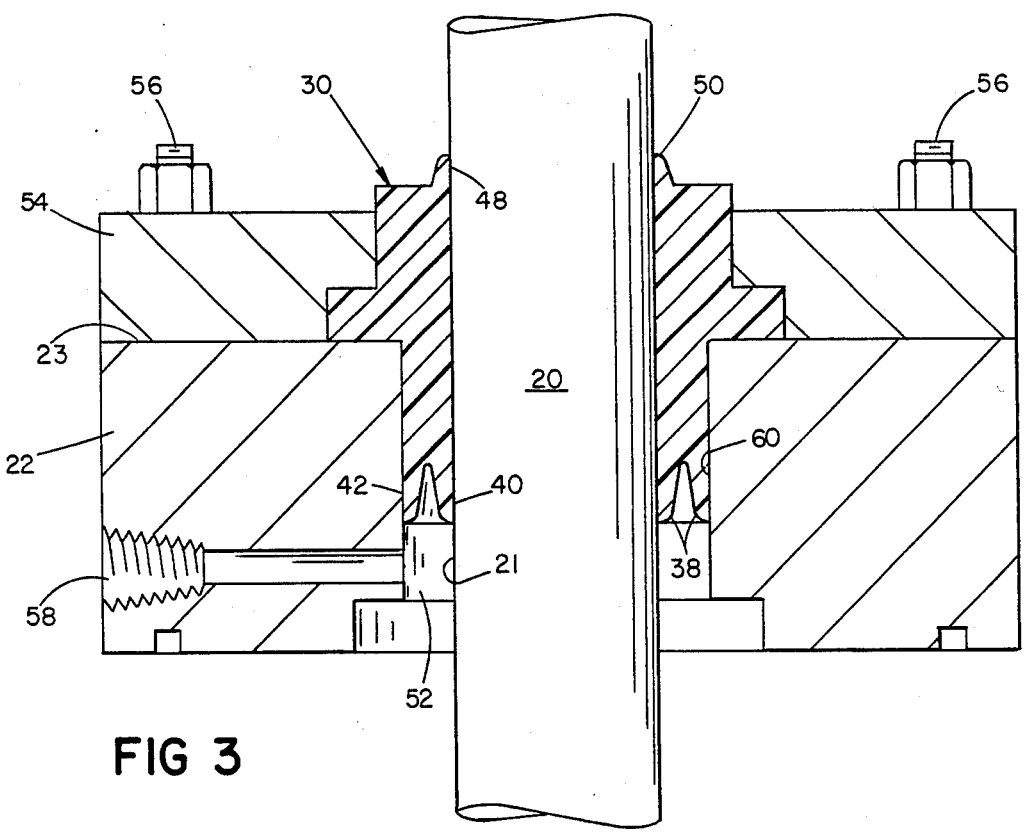
FIG 3
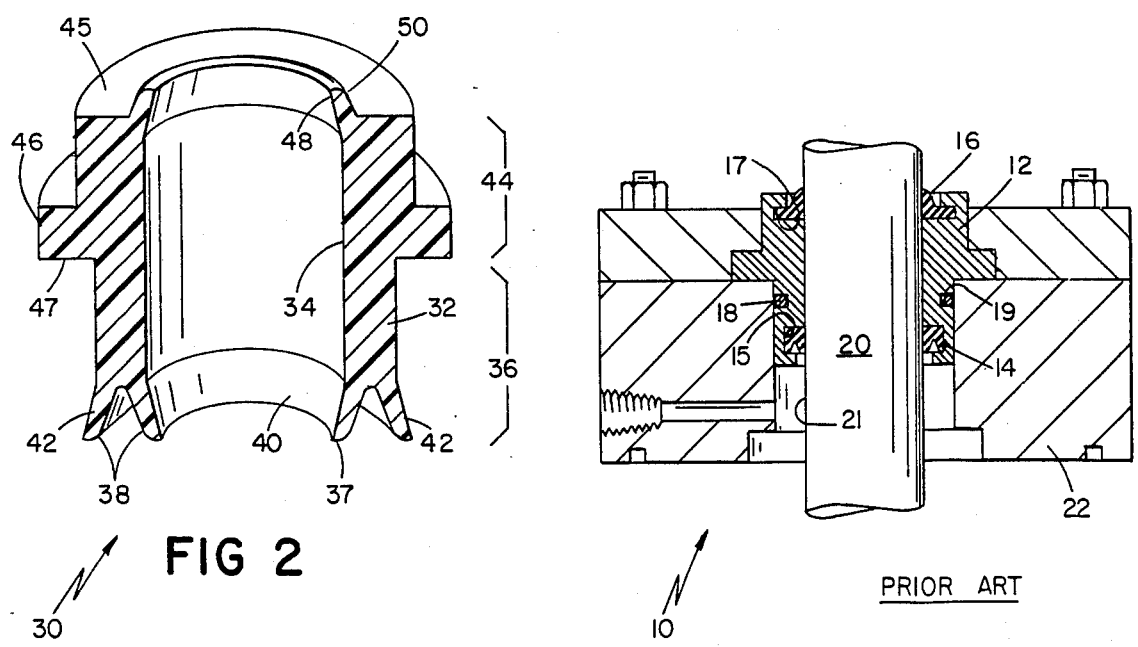
FIG 2
FIG 1 PRIOR ART

MULTIPLE-LIP SEAL FOR CYLINDER ROD AND THE LIKE

A rod end sealing assembly in the end cap of a hydraulic or pneumatic cylinder typically consists of three separate components: a rod bearing, bushing or gland, usually of brass or bronze, or sometimes steel; a packing or pressure seal; and a wiper ring, also termed an excluder or scraper. An o-ring may also be employed. Each separate component performs a specific function, and each component must be present for the assembly to prevent leakage and exclude contaminants from the cylinder. In the past, this has made it necessary to have on-hand an extensive, and oftimes expensive, inventory of individual components.

SUMMARY OF THE INVENTION

According to the invention, an integral sealing system for a cylinder or piston rod and the like, for bearing, sealing and wiping a piston rod during reciprocating motion, comprises, in a molded, polymeric unit: a body defining an inner bearing surface dimensioned to engage in bearing relationship about a piston rod surface, the body having an interior end portion sized to fit within a cylinder end cap stuffing box, and an exterior end portion having a radially outwardly extending annular flange and configured for mating relationship with a gland retaining plate, the interior end portion terminating in a divergent pair of generally axially-extending, annular tapered, peripheral lips, the outer surfaces of the pair of lips defining inner and outer sealing surfaces adapted, under pressure in the cylinder stuffing box, to engage respectively opposed surfaces of a cylinder rod and a cylinder end cap in sealing relationship, and the bearing surface, in the exterior end portion, tapering radially inwardly, the tapering inner surface adapted to wipe the surface of the piston rod to exclude foreign matter from entering between the bearing surface and the opposed surface of the piston rod.

In preferred embodiments, the exterior end portion terminates in a protruding lip; and the unit is formed of polyurethane.

Thus there is provided by the invention an integral sealing system for cylinder rods and the like incorporating the functions of the rod bearing, packing seal and wiper ring in a unit formed, e.g., of molded polymeric material. The sealing system of the invention offers the advantages of lower cost and longer life in an integral unit.

Other features and advantages of the invention will be apparent from following description of a preferred embodiment, and from the claims.

PREFERRED EMBODIMENTS

We first briefly describe the drawings:

FIG. 1 is a cross-sectional view of a conventional prior art metallic rod bearing, including separate rod seal, rod wiper and o-ring;

FIG. 2 is a perspective view of the integral sealing system of the invention; and FIG. 3 is a cross-sectional view of the integral sealing system of FIG. 2 installed for use.

Referring to FIG. 1, a conventional prior art cylinder rod end assembly 10 consists of a metallic rod bearing 12, typically brass, bronze or even steel; a packing seal 14; a wiper 16; and an o-ring 18. The packing seal, e.g., a STYLE 10,000 SUPER-MONOSEAL ®, manufactured of non-absorbent polymer by A. W. Chesterton Company of Stoneham, Mass., is disposed in an annular groove 15 defined in the inner surface of the bearing, adjacent its interior end, to form a seal between the bearing and the surface 21 of cylinder rod 20. Wiper 16, e.g., a molded polymer STYLE 5,000 SUPER-WIPER ™, also manufactured by A. W. Chesterton Company, is disposed in an annular groove 17 defined in the inner surface of the bearing, at its exterior end, to exclude foreign material, e.g., dirt, abrasives, dust, etc., from entering the bearing and seal areas, where it can cause scoring of the cylinder rod and reduce the life of the cylinder rod, bushings and seals. O-ring 18 is disposed in a groove 19 defined in the outer surface of the bearing to form a seal between the bearing and the surrounding end cap 22.

The integral sealing system 30 (FIG. 2) of the invention consists of a unit molded of polymeric material, e.g., polyurethane. The material of system 30 is selected for dimensional stability and physical properties such as resistance to wear and fluids found in its working environment.

Integral sealing system 30 consists of a body 32 defining an inner bearing surface 34 dimensioned to engage in bearing relationship about the surface of a cylinder or piston rod. The interior end portion 36 of the system 30 is sized to be received into a cylinder end cap stuffing box, and the interior end 37 terminates in a divergent pair of generally axially-extending, annular, tapered peripheral lips 38, the outer surfaces of the lips defining inner and outer sealing surfaces 40, 42. The exterior end portion 44 of the system 30 has an annular flange 46 and is configured for mating relationship with a gland retaining plate. The inner bearing surface 34 tapers inwardly adjacent the exterior end 45 of system, defining a wiping surface 48, and terminates in an outwardly protruding lip 50 to form a wiper.

Referring to FIG. 3, the integral sealing system 30 is installed, e.g., on a positioning type cylinder for a welder robot on an automobile assembly line, by pressing the system over the cylinder piston rod 20 and sliding the system along surface 21 until the interior end portion 36 of the integral system is fully inserted into the end cap stuffing box 52 and the undersurface 47 of flange 46 is engaged upon the surface 23 of end cap 22. Gland retaining plate 54 is then forced over the exterior end portion 44 of integral system whereby the plate mates with system 30, as well as with the top surface of the end cap 22, as shown in the figure. Four threaded draw rods 56 are installed to secure the complete cylinder (not shown) together for operation.

When pressure, e.g., up to 1,200 psi, is applied through fill port 58, the divergent pair of annular, tapered lips 38 flare apart to cause the sealing surfaces 40, 42 to press against the rod surface 21 and against the surrounding surface 60 of the end cap stuffing box 52, thereby creating a leak-tight seal. The protruding tapered lip 50 at the exterior end 45 of the system 30 wipes the rod surface 21 clean in a manner to prevent contaminants from entering the system.

The entire integral system 30 is completely stable in the aspects of dimension and physical properties, allowing the integral system to function as a bearing to guide the rod 20 in a center position while reciprocating in motion, and further acting as a seal and as a wiper.

The integral system 30 of the invention is formed in a mold (not shown) composed of a female lower portion and a male top portion. The female portion has circular grooves in its bottom. The male top portion has a rounded circular protruding surface for forming the divergent pair of lips 38. The method of molding is generally as described in U.S. Pat. No. 4,239,245, the disclosure of which is incorporated herein by reference. That patent and the invention described herein are co-owned.

The integral system is formed of a liquid, thermo-setting plastic, preferably urethane elastomer, made by mixing a liquid resin such as L167 from Uniroyal with a catalyst such as 4, 4-Methylene-BIS (2-Chloroaniline), available from the Polyester Corporation of New York. The catalyst is in pellet form, and is melted prior to mixing with the liquid resin. The resulting liquid plastic is then heated to 180° to 220° F. and poured into the circular grooves of the mold bottom portion. The mold top portion is closed over the bottom portion, the rounded circular protrusions pushing into the liquid plastic in the female groove to form the wiper portion of the integral sealing system of the invention. The mold portions are pressed together, e.g., by hydraulic presses exerting a pressure of 1000 psi (less pressure may be used). At the same time, the mold is heated to maintain the plastic temperature in the range of 180° F. to 220° F. Compression molding is continued for 8 to 10 minutes, then the mold is opened and the heat shut off. The compression molding partially cures the liquid plastic into a solid plastic gum stage.

The partially cured integral system is then placed in an oven at 180° to 220° F. for 3 to 6 hours for a final curing, to form a hardened, elastomeric finished part that resists wear and extrusion and is non-absorbent.

Other embodiments of the invention are within the following claims. For example, other thermo-setting materials and different resins and catalysts may be used to form the integral system. The mold may have a different shape, and the configuration and dimensions of the system may be varied. Also, much less pressure than 1,000 psi may be used in compression molding.

What is claimed is:

1. An integral sealing system for a cylinder or piston rod and the like, for bearing, sealing and wiping a piston rod during reciprocating motion, comprising, in a molded, polymeric unit:

a body defining an inner bearing surface dimensioned to engage in bearing relationship about a piston rod surface, said body having an interior end portion sized to fit within a cylinder end cap stuffing box, and an exterior end portion having a radially outwardly extending annular flange and configured for mating relationship with a gland retaining plate, said interior end portion terminating in a divergent pair of generally axially-extending, annular tapered, peripheral lips, the outer surfaces of said pair of lips defining inner and outer sealing surfaces adapted, under pressure in the cylinder stuffing box, to engage respectively opposed surfaces of a cylinder rod and a cylinder end cap in sealing relationship, and said bearing surface, in said exterior end portion, tapering radially inwardly, said tapering inner surface adapted to wipe the surface of said piston rod to exclude foreign matter from entering between said bearing surface and the opposed surface of the piston rod.

2. The integral sealing system of claim 1 wherein said exterior end portion terminates in a protruding lip.

3. The integral sealing system of claim 1 wherein said unit is formed of polyurethane.

* * * * *